United States Patent [19]
Stine et al.

[11] Patent Number: 5,394,772
[45] Date of Patent: Mar. 7, 1995

[54] COMPOUND TRANSMISSION HAVING DOUBLE SPLITTER GEAR AUXILIARY SECTION

[75] Inventors: Alan C. Stine, Kalamazoo; Timothy G. Newman, Southfield, both of Mich.

[73] Assignee: Eaton Corporation, Cleveland, Ohio

[21] Appl. No.: 61,690

[22] Filed: May 14, 1993

[51] Int. Cl.⁶ .................. F16H 3/02; F16H 3/093
[52] U.S. Cl. .......................... 74/745; 74/331
[58] Field of Search ............ 74/325, 329, 331, 333, 74/745

[56] References Cited

U.S. PATENT DOCUMENTS

| | | |
|---|---|---|
| 2,637,221 | 5/1953 | Backus . |
| 2,637,222 | 5/1953 | Backus . |
| 3,105,395 | 10/1963 | Perkins . |
| 3,283,613 | 11/1966 | Perkins . |
| 3,335,616 | 8/1967 | Perkins . |
| 3,648,546 | 3/1972 | McNamara et al. . |
| 4,290,515 | 9/1981 | Bogema et al. . |
| 4,440,037 | 4/1984 | Foxton et al. ............ 74/331 |
| 4,527,447 | 7/1985 | Richards ............ 74/745 |
| 4,754,665 | 7/1988 | Vandervoot ............ 74/331 |
| 4,876,924 | 10/1989 | Fletcher et al. ............ 74/331 |
| 4,901,600 | 2/1990 | Wilson ............ 74/331 |
| 5,062,313 | 11/1991 | Fletcher ............ 74/333 |

*Primary Examiner*—Edward K. Look
*Assistant Examiner*—Michael S. Lee
*Attorney, Agent, or Firm*—Brooks & Kushman

[57] ABSTRACT

A compound transmission comprising a main section and auxiliary section is disclosed. The main section provides five forward gears. The auxiliary section includes an auxiliary drive gear rotatably mounted on an input shaft, and two splitter gears rotatably mounted on an output shaft. Each of the auxiliary section gears is engaged with a corresponding auxiliary countershaft gear. A first splitter clutch rotatable with the input shaft couples either the auxiliary drive gear or the first splitter gear to the input shaft. A second splitter clutch rotatable with the output shaft couples either the first splitter gear or the second splitter gear to the output shaft. Other embodiments having an auxiliary drive gear rotationally fixed to the input shaft are also disclosed.

21 Claims, 4 Drawing Sheets

COMPOUND TRANSMISSION HAVING DOUBLE SPLITTER GEAR AUXILIARY SECTION

TECHNICAL FIELD

The present invention relates to compound transmissions including a multispeed main transmission section connected in series with a multispeed auxiliary transmission section, and in particular to such a compound transmission having an auxiliary section with two splitter gears.

BACKGROUND ART

Compound change gear transmissions of the type having one or more auxiliary sections connected in series with a main transmission section are known in the prior art. Briefly, by utilizing main and auxiliary transmission sections connected in series, assuming proper sizing of the ratio steps, the total of available transmission ratios is equal to the product of the main and auxiliary section ratios. By way of example, a compound change gear transmission comprising a four (4) speed main section connected in series with a three (3) speed auxiliary section will theoretically provide twelve ($4 \times 3 = 12$) available ratios.

Auxiliary transmission sections are of three general types: range type, splitter type or combined range/splitter type. In compound transmission having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. No. 3,105,395; U.S. Pat. No. 2,637,222; and U.S. Pat. No. 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. No. 4,290,515; U.S. Pat. No. 3,799,002; U.S. Pat. No. 4,440,037; and U.S. Pat. No. 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

Examples of a compound transmission having a single combined range/splitter type auxiliary section may be seen by reference to U.S. Pat. No. 3,283,613 and U.S. Pat. No. 3,648,546, the disclosures of which are hereby incorporated by reference. Eaton also produces the "Super 10" compound transmission which has a 2+1 main section and an auxiliary section having both range and splitter gears. All three forward ratios are used in the low range, while two forward ratios are repeated in the high range. This results in a standard 5 speed shift pattern.

Another example of a combined range and splitter type compound transmission is the "Ecosplit" model of transmission sold by Zahnradfabrik Friedrichshafen Aktiengeseushaft of Friedrichshafen, Germany, which utilizes a separate splitter auxiliary section in front of, and a separate range auxiliary section behind, the main transmission section. Still another example is the RMO-13-145A thirteen speed transmission sold by Rockwell Corporation, in which the high range forward ratios are split.

It should be noted that the terms main and auxiliary section are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

SUMMARY OF THE INVENTION

The present invention is a compound transmission comprising a main transmission section connected in series with an auxiliary transmission section. The auxiliary transmission section comprises an input shaft having an auxiliary drive gear rotatably mounted thereon, and an output shaft having a first splitter gear surrounding and generally coaxial therewith and a second splitter gear rotatably mounted thereon. At least one countershaft is provided having first, second and third auxiliary countershaft gears rotatable with the auxiliary countershaft and rotatably engaged with the auxiliary drive gear, first splitter gear, and second splitter gear, respectively. A first splitter clutch is fixed for rotation with the input shaft and couples either the auxiliary drive gear or the first splitter gear to the input shaft. A second splitter clutch fixed for rotation with the output shaft couples either the first splitter gear or the second splitter gear to the output shaft.

In another embodiment of the invention, the auxiliary drive gear is rotationally fixed to the input shaft, and the output shaft has the first and second splitter gears rotatably mounted thereon. The first splitter clutch rotates with the output shaft and alternates among coupling the auxiliary drive gear to the output shaft, a nonengaged position, and coupling the first splitter gear to the output shaft. The second splitter also rotates with the output shaft and alternates between a nonengaged position and coupling the second splitter gear to the output shaft.

In still another embodiment of the invention, the auxiliary drive gear is rotationally fixed to the input shaft, and the output shaft has the first and second splitter gears rotatably mounted thereon. The first splitter clutch rotates with the input shaft and alternates between a nonengaged position and coupling the input shaft to the output shaft. The second splitter clutch rotates with the output shaft and moves among coupling the first splitter gear to the output shaft, a nonengaged position, and a coupling the second splitter gear to the output shaft.

Accordingly, it is an object of the present invention to provide a new and improved compound transmission having a three layer, four-speed auxiliary transmission section including a splitter gear and an overdrive splitter gear.

This and other objects and advantages of the present invention will become apparent from a reading of the detailed description of the preferred embodiment taken in connection with the drawings.

DESCRIPTION OF THE PREFERRED EMBODIMENT

Figure 1:
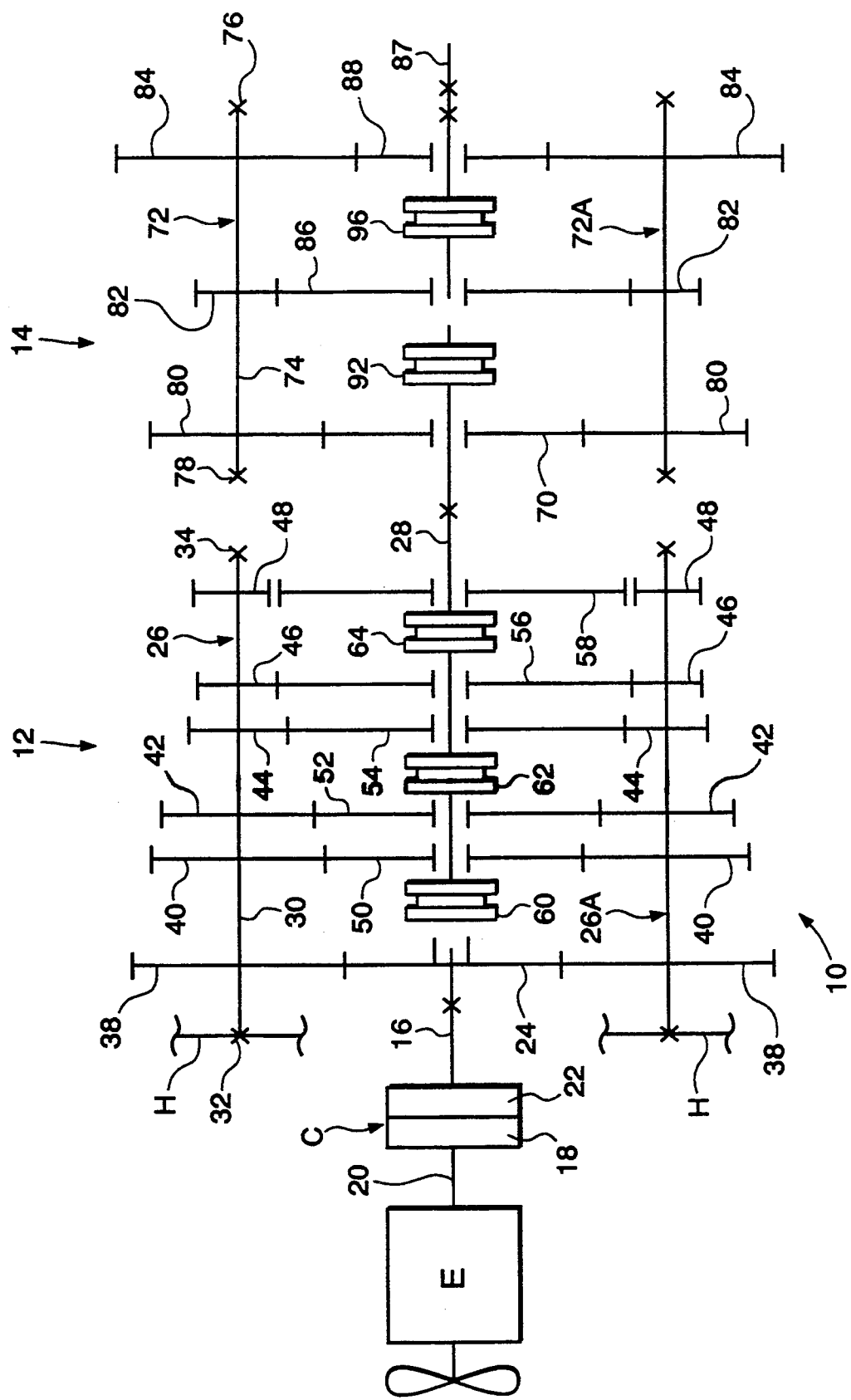
FIG. 1 is a schematic illustration of a compound transmission having an auxiliary section with two splitter gears.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section.

FIG. 1 shows an eleven speed compound transmission 10 according to the present invention. Compound transmission 10 comprises a multiple speed main transmission section 12 connected in series with an auxiliary transmission section 14. Typically, transmission 10 is housed within a single housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 rotationally fixed thereto for simultaneously driving a plurality of countershaft assemblies at substantially identical rotational speeds. In the transmission 10 illustrated, two substantially identical main section countershaft assemblies 26 and 26A are provided on opposite sides of mainshaft 28, which is generally coaxially aligned with the input shaft 16. Each of the main section countershaft assemblies 26 and 26A comprises a main section countershaft 30 supported by bearings 32 and 34 in housing H, only a portion of which is schematically illustrated. Each of the main section countershafts 30 is provided with an identical grouping of main section countershaft gears 38, 40, 42, 44, 46 and 48, fixed for rotation therewith.

A plurality of main section drive or mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group, which mounting means and special advantages resulting therefrom are explained in greater detail in U.S. Pat. No. 3,105,395 and U.S. Pat. No. 3,335,616, the disclosures of which are hereby incorporated by reference.

Typically, clutch collars 60, 62 and 64 are axially positioned by means of shift yokes or forks (not illustrated) associated with a shift bar housing assembly (not illustrated), for example as described in U.S. Pat. No. 4,901,600, assigned to the assignee of the present invention and hereby incorporated by reference. Clutch collars 60, 62 and 64 are, in the preferred embodiment, of the well known nonsynchronized double acting jaw clutch type. Jaw clutches 60, 62, and 64 are three-position clutches in that they may be positioned in a centered axially nondisplaced, nonengaged position as illustrated, or in a fully rightwardly engaged or fully leftwardly engaged position by means of a shift lever. As is well known, only one of the clutches 60, 62 and 64 is engageable at a given time and main section interlock means are provided to lock the other clutches in the neutral condition.

Although the present invention is illustrated as a multiple identical countershaft, floating mainshaft and floating mainshaft gear type, and while the auxiliary transmission section of the present invention is particularly well suited for such transmission structure, the advantages of the present invention are equally applicable to transmission of the single countershaft or nonidentical multiple countershaft type.

Main transmission section 12 provides five selectable forward speed ratios. The first and lowest forward speed ratio is provided by drivingly connecting mainshaft drive gear 56 to mainshaft 28. The other four forward speed ratios, in descending order of reduction ratio provided, are obtained by drivingly coupling gears 54, 52, 50 or 24 to the mainshaft 28. Main section mainshaft gear 58 is the reverse gear and is in continuous meshing engagement with countershaft gears 48 by means of conventional intermediate idler gears (not shown).

Auxiliary transmission section 14 is connected in series with main transmission section 12. Mainshaft 28 extends into the auxiliary section 14 and carries an auxiliary drive gear 70 rotatably mounted thereon. The auxiliary drive gear 70 may be fixed to the mainshaft 28, as described below, to simultaneously drive two substantially identical auxiliary section countershaft assemblies 72 and 72A at equal rotational speeds. Each of the auxiliary countershaft assemblies 72 and 72A comprises an auxiliary countershaft 74 supported by bearings 76 and 78 in housing H and carrying three auxiliary section countershaft gears 80, 82 and 84 for rotation therewith.

Auxiliary section countershaft gears 80 are constantly meshed with and support auxiliary section auxiliary drive gear 70 which surrounds mainshaft 28. Auxiliary section countershaft gears 82 are constantly meshed with and support a first auxiliary section splitter gear 86 which surrounds output shaft 87 at the end thereof adjacent the coaxial end of mainshaft 28. Auxiliary section countershaft gears 84 constantly mesh with and support a second auxiliary section splitter gear 88, which surrounds the output shaft 87. Accordingly, auxiliary section countershaft gears 80 and auxiliary drive gear 70 define a first gear layer, auxiliary section countershaft gears 82 and splitter gear 86 define a second gear layer, and auxiliary section countershaft gears 84 and splitter gear 88 define a third layer, or gear group, of the auxiliary transmission section 14.

A sliding two position jaw clutch collar 92 is splined on the extension of the mainshaft 28 for rotation therewith. Clutch assembly 92 may be selectively located in the leftwardmost axial position to drivingly couple the auxiliary drive gear 70 to the mainshaft 28, or may be selectively positioned in the rightwardmost axial position to drivingly couple the mainshaft to the first splitter gear 86.

A sliding two position jaw clutch collar 96 is similarly splined to and carried on the output shaft 87. Splitter clutch collar 96 may be selectively located in the leftwardmost axial position to drivingly couple the first splitter gear 86 to the output shaft 87, or may be selectively located in the rightwardmost axial position to rotationally couple the second splitter gear 88 to the output shaft. Typically, clutch assemblies 92 and 96 are axially positioned by means of shift forks (not shown) controlled by a remotely controlled fluid actuated piston assembly. The piston assembly is operable by a driver selection switch such as a button or the like on the shift knob, for example as described in U.S. Pat. No. 5,000,060, assigned to the assignee of the present invention and hereby incorporated by reference. The structure and function of the double acting sliding jaw clutch collars 92 and 96 are substantially identical to the structure and function of jaw clutch collars 60, 62 and 64 utilized in the main transmission section 12.

Figure 2:
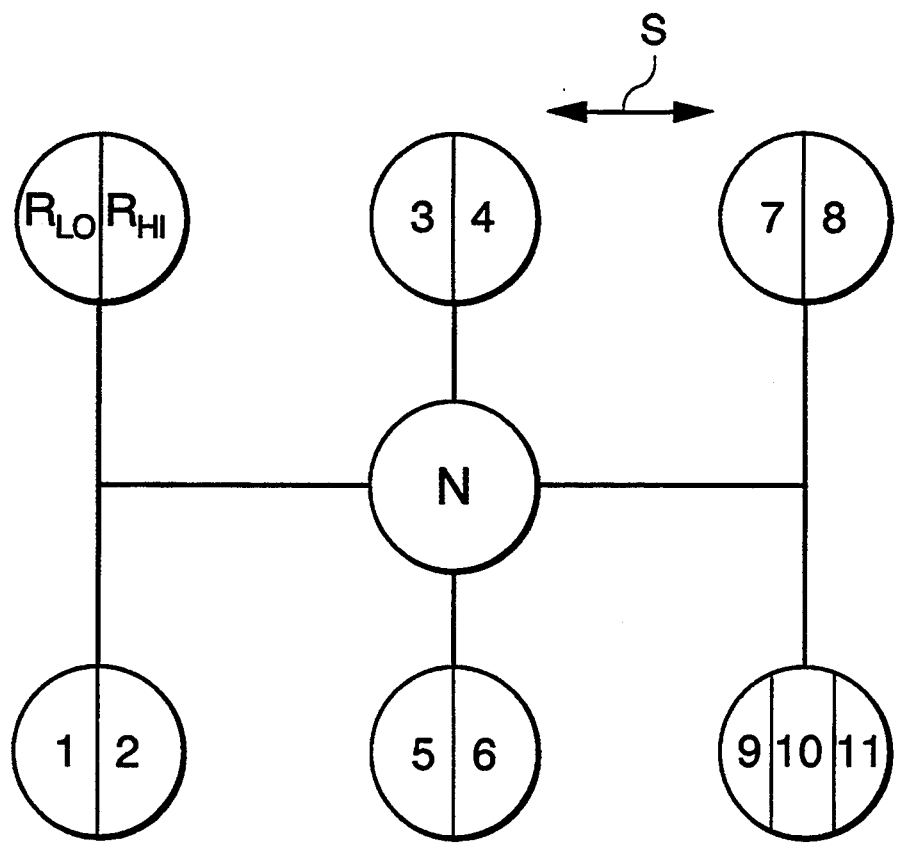
FIG. 2 is a schematic illustration of a shift pattern for the compound transmission.

FIG. 2 shows the shift pattern for the eleven speed compound transmission 10. Divisions in the horizontal direction represented by arrow S represent splitter shifts. Five of the six shift pattern positions provide two selectable ratios, including the reverse gear position. In the leftwardmore shift pattern positions, the clutch 92 couples the auxiliary drive gear 70 to the mainshaft 28. In the rightwardmore shift pattern positions, the clutch 92 couples the splitter gear 86 to the mainshaft 28, which establishes a direct drive between the mainshaft and the output shaft 87 with the clutch in its normally leftwardmost position.

The sixth position occupied by the lower right of the shift pattern provides a third selectable ratio corresponding to an eleventh or overdrive gear. The overdrive ratio is provided when the clutch 92 rotatably couples the mainshaft 28 to the auxiliary drive gear 70, and the clutch 96 rotatably couples the overdrive splitter gear 88 to the output shaft 87.

Disregarding the reverse ratio, it is desirable that the main section ratio steps be generally equal, and the splitter steps be generally equal to the square root of the main section ratio steps. Given these desired ideal ratios, gearing to approximate these ratios is selected. A preferred embodiment of the present invention provides the following relationships:

| Gear | # Teeth | Set Ratio | Overall Ratio | % Step |
|---|---|---|---|---|
| 24 (Drive) | 40 | 1.95 | 1 | |
| 38 | 78 | | | 77.3 |
| 50 (3rd) | 50 | 0.9090 | 1.7727 | |
| 40 | 55 | | | 77.1 |
| 52 (2nd) | 66 | 1.6097 | 3.1390 | |
| 42 | 41 | | | 77.5 |
| 54 (1st) | 60 | 2.8571 | 5.5714 | |
| 44 | 21 | | | 78.2 |
| 56 (Low) | 56 | 5.0909 | 9.9297 | |
| 46 | 11 | | | |
| 58 (Reverse) | 56 | 5.0909 | 9.9297 | |
| 48 | 11 | | | |
| 70 (Aux Drive) | 34 | 1.2352 | 1 | |
| 80 | 42 | | | 33.3 |
| 86 (1st Split) | 41 | 1.0789 | 1.3328 | |
| 82 | 38 | | | 26.5 |
| 88 (OD Split) | 32 | 0.64 | 0.7905 | |
| 84 | 50 | | | |

The compound transmission 10 thus provides eleven forward speeds and two reverse speeds as indicated in the chart below:

| Gear Name | Ratio | Overall Ratio | % Step |
|---|---|---|---|
| 1 | 13.23 | 16.74 | — |
| 2 | 9.927 | 12.56 | 33.3 |
| 3 | 7.425 | 9.39 | 33.7 |
| 4 | 5.571 | 7.05 | 33.3 |
| 5 | 4.183 | 5.29 | 33.2 |
| 6 | 3.139 | 3.97 | 33.3 |
| 7 | 2.362 | 2.99 | 32.9 |
| 8 | 1.772 | 2.24 | 33.3 |
| 9 | 1.332 | 1.69 | 33.0 |
| 10 | 1 | 1.26 | 33.3 |
| 11 (Overdrive) | 0.790 | 1.00 | 26.5 |
| Rev-Low | 13.23 | 16.74 | |
| Rev-High | 9.927 | 12.56 | |

Figure 3:
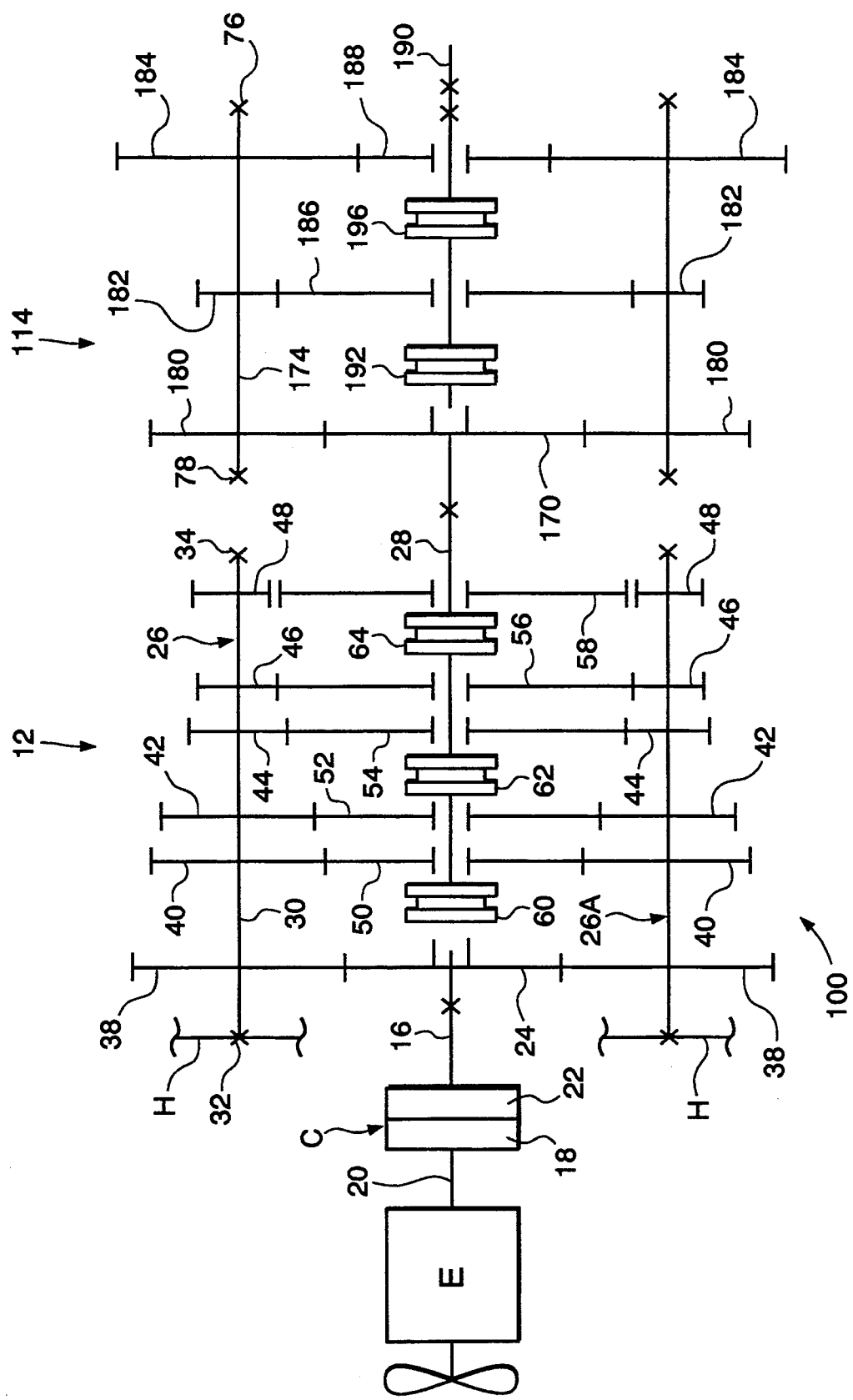
FIG. 3 is a schematic illustration of an alternative embodiment of the compound transmission shown in FIG. 1.

FIG. 3 shows an alternative embodiment 100 of the present invention. Compound transmission 100 comprises a main transmission section 12 substantially similar to the main section shown in FIG. 1, and an auxiliary transmission section 114 connected in series with main transmission section 12. Mainshaft 28 extends into the auxiliary section 114 and carries an auxiliary drive gear 170 splined for rotation therewith. The auxiliary drive gear 170 drives auxiliary section countershafts 174 through countershaft gears 180, to which countershaft gears 182 and 184 are rotationally fixed. Auxiliary section countershaft gears 182 and 184 constantly mesh with and respectively support splitter gears 186 and 188, which are rotatably mounted on output shaft 190.

The splitter clutch 192 is rotatable with the output shaft 190, and is axially positionable to drivingly couple either the auxiliary drive gear 170 or the splitter gear 186 to the output shaft. The splitter clutch 196 is similarly splined on the output shaft 190, and is axially positionable in either a central nonengaged position or to rotationally couple the output shaft to either the overdrive splitter gear 188.

In the first forward gear shift pattern position shown in FIG. 2, the clutch 192 is in the rightwardmost axial position drivingly coupling splitter gear 186 to the output shaft 190, and the splitter clutch 196 is in the nonengaged position. To obtain the second forward ratio, the operator presses the split button on the gearshift lever to move the clutch 192 to drivingly couple the auxiliary drive gear 170 to the output shaft 190 and thereby establish a direct drive through the auxiliary section. The splitter clutch 192 alternates between these two positions for the remaining four forward speed ratios supplied by the main section 12, alternately splitting and establishing a direct drive for the main section gear ratios. The overdrive ratio is obtained by moving the clutch 192 to a nonengaged position, which is accomplished by providing stops in the air cylinders controlling the position of the clutch 192, and moving the clutch 196 to couple the overdrive splitter gear 188 to the output shaft 190.

The preferred embodiment of the auxiliary section 114 provides the same gear relationships as the auxiliary section 14 described above, and uses the same shift pattern shown in FIG. 2. As an alternative to the auxiliary section configuration shown in FIG. 3, the clutch 192 may be designed to move between engagement with the auxiliary drive gear 170 and a nonengaged position, while the clutch 196 moves among engagement with the splitter gear 186, a nonengaged position, and engagement with the splitter gear 188.

Figure 4:
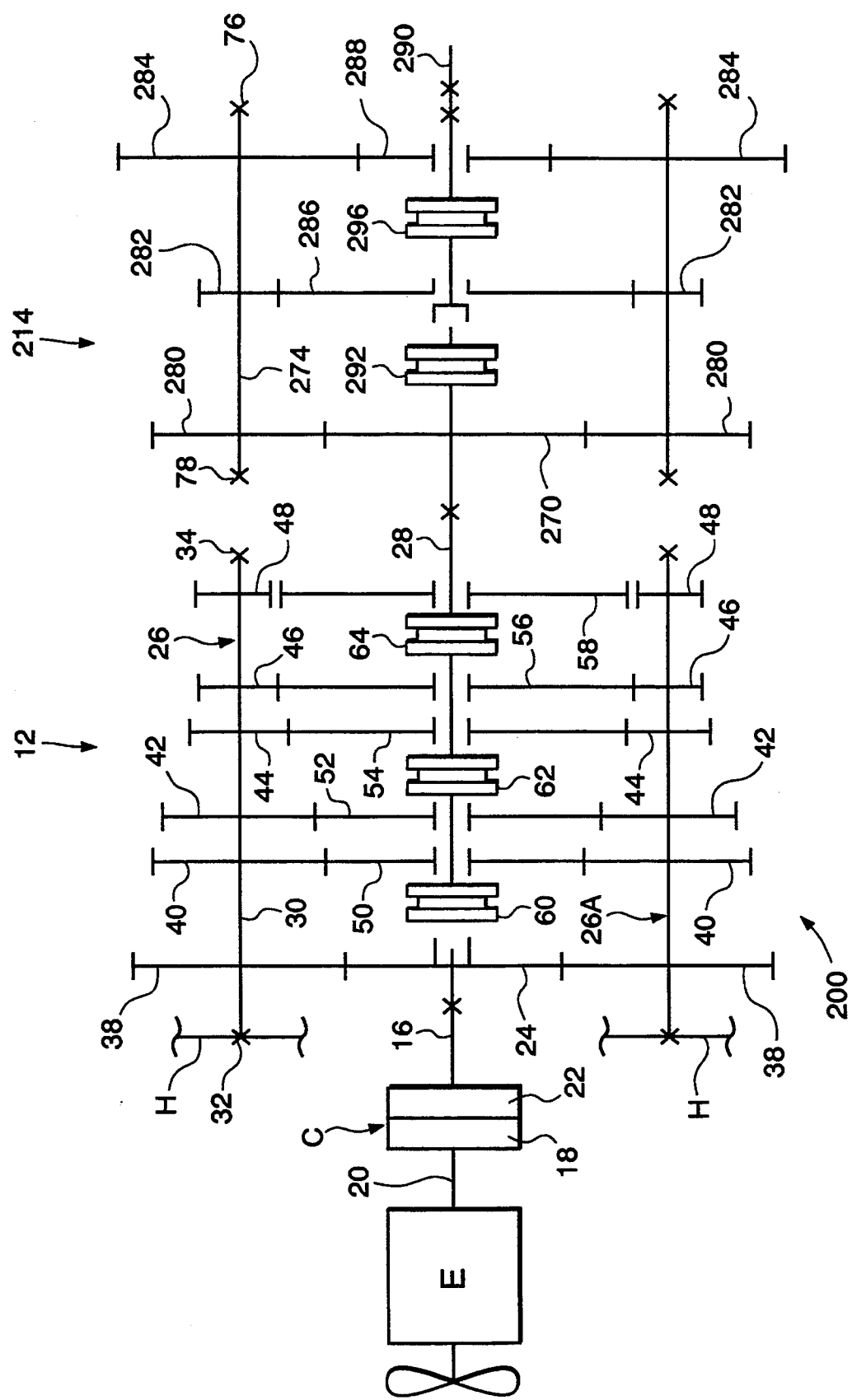
FIG. 4 is a schematic illustration of another alternative embodiment of the compound transmission.

FIG. 4 shows another alternative embodiment 200 of the present invention. The compound transmission 200 is substantially similar to the embodiments shown in FIGS. 1 and 3, except that mainshaft 28 extends into the auxiliary section 214 and carries both the auxiliary drive gear 270 and the splitter clutch 292 fixed thereto. The splitter clutch 292 is splined for rotation with the mainshaft 28, and is axially positionable in either a nonengaged position or to drivingly couple the mainshaft 28 to the output shaft 290 for direct drive. The auxiliary drive gear 270 constantly and simultaneously meshes with countershaft gear 280 to drive auxiliary section countershafts 274 at equal rotational speeds, and the countershafts 274 rotate countershaft gears 282 and 284. Splitter gears 286 and 288 are rotatably mounted on the output shaft 290 and are constantly meshed with countershaft gears 282 and 284, respectively.

The splitter clutch 296 is similarly splined on the output shaft 290 for rotation therewith, and is axially positionable to engage the splitter gear 286, in a central nonengaged position, or to rotationally couple the output shaft to the overdrive splitter gear 288.

In the first forward gear shift pattern position shown in FIG. 2, the clutch 292 is in the nonengaged axial position, and the splitter clutch 296 is in the leftwardmost position coupling splitter gear 286 to the output shaft 290. To obtain the second forward ratio, the operator presses the split button on the gearshift lever to move the clutch 292 to drivingly couple the mainshaft 28 to the output shaft 290 and thereby establish a direct drive through the auxiliary section. At the same time, the splitter clutch 296 moves to the nonengaged position. The splitter clutches 292 and 296 alternate in sequence between their two respective positions for the remaining four forward speed ratios supplied by the main section 12, alternately splitting and establishing a direct drive for the main section gear ratios. The overdrive ratio is obtained by moving the clutch 292 to the nonengaged position, and moving the clutch 296 to couple the overdrive splitter gear 288 to the output shaft 290.

The preferred embodiment of the auxiliary section 214 provides the same gear relationships as the auxiliary section 14 described above, and uses the same shift pattern shown in FIG. 2. As an alternative to the auxiliary section configuration shown in FIG. 3, the clutch 292 may be designed to move between engagement with an auxiliary drive gear rotatably mounted on the mainshaft and engagement with the first splitter gear, while the clutch 296 moves in the same manner, i.e. among engagement with the splitter gear 286, a nonengaged position, and engagement with the splitter gear 288 for overdrive.

The present invention provides a transmission having an auxiliary section which does not require a range synchronizer. Because three ratios are provided from the top lever position, a broad speed range is accessible through simple button shifts. This allows the operator to employ only button shifts for vehicle speeds over about 25 miles per hour.

Although the present invention has been set forth with a certain degree of particularity, it is understood that various modifications are possible without departing from the spirit and the scope of the invention as hereinafter claimed.

What is claimed is:

1. A compound transmission comprising a main section connected in series with an auxiliary section, the auxiliary section comprising:
    an input shaft having an auxiliary drive gear rotatably mounted thereon;
    an output shaft having a first splitter gear surrounding and generally coaxial therewith and a second splitter gear rotatably mounted thereon;
    at least one countershaft having first, second and third auxiliary countershaft gears rotatable with the auxiliary countershaft and rotatably engaged with the auxiliary drive gear, first splitter gear, and second splitter gear, respectively;
    a first splitter clutch fixed for rotation with the input shaft and having a first position for coupling the auxiliary drive gear to the input shaft and a second position for coupling the first splitter gear to the input shaft; and
    a second splitter clutch fixed for rotation with the output shaft and having a first position for coupling the first splitter gear to the output shaft and a second position for coupling the second splitter gear to the output shaft.

2. The compound transmission of claim 1 wherein the auxiliary section input shaft is driven by the main section.

3. The compound transmission of claim 1 wherein the auxiliary section input shaft comprises a mainshaft of the main transmission section.

4. The transmission of claim 3 wherein the mainshaft is generally coaxial with the output shaft.

5. The compound transmission of claim 1 wherein the main section provides a plurality of selectable forward speed ratios between a main section input shaft and the auxiliary section input shaft.

6. The compound transmission of claim 5 wherein the main section provides five selectable forward speed ratios.

7. The compound transmission of claim 1 wherein the second splitter gear is coupled to the output shaft to provide an overdrive ratio.

8. A compound transmission comprising a main transmission section connected in series with an auxiliary transmission section, the auxiliary transmission section comprising:
    an input shaft having an auxiliary drive gear rotationally fixed thereto;

an output shaft having a first splitter gear and a second splitter gear rotatably mounted thereon;

an auxiliary section countershaft having first, second and third auxiliary countershaft gears rotationally fixed to the auxiliary countershaft and rotatably engaged with the auxiliary drive gear, first splitter gear, and second splitter gear, respectively;

a first splitter clutch fixed for rotation with the output shaft and having a first position for coupling the auxiliary drive gear to the output shaft, a second nonengaged position, and a third position for coupling the first splitter gear to the output shaft; and a second splitter clutch fixed for rotation with the output shaft and having a first nonengaged position and a second position for coupling the second splitter gear to the output shaft.

9. The compound transmission of claim 8 wherein the auxiliary section input shaft is driven by the main transmission section.

10. The compound transmission of claim 8 wherein the auxiliary section input shaft comprises a mainshaft of the main transmission section.

11. The compound transmission of claim 10 wherein the mainshaft is generally coaxial with the output shaft.

12. The compound transmission of claim 8 wherein the main transmission section provides a plurality of selectable forward speed ratios between a main transmission section input shaft and the auxiliary transmission section input shaft.

13. The compound transmission of claim 12 wherein the main transmission section provides five selectable forward speed ratios.

14. The compound transmission of claim 8 wherein the second splitter gear is coupled to the output shaft to provide an overdrive ratio.

15. A compound transmission comprising a main transmission section connected in series with an auxiliary transmission section, the auxiliary transmission section comprising:

an input shaft having an auxiliary drive gear rotationally fixed thereto;

an output shaft having a first splitter gear and a second splitter gear rotatably mounted thereon;

an auxiliary section countershaft having first, second and third auxiliary countershaft gears rotationally fixed to the auxiliary countershaft and rotatably engaged with the auxiliary drive gear, first splitter gear, and second splitter gear, respectively;

a first splitter clutch fixed for rotation with the input shaft and having a first nonengaged position and a second position for coupling the input shaft to the output shaft; and a second splitter clutch fixed for rotation with the output shaft and having a first position for coupling the first splitter gear to the output shaft, a second nonengaged position, and a third position for coupling the second splitter gear to the output shaft.

16. The compound transmission of claim 15 wherein the auxiliary section input shaft is driven by the main transmission section.

17. The compound transmission of claim 15 wherein the auxiliary section input shaft comprises a mainshaft of the main transmission section.

18. The transmission of claim 17 wherein the mainshaft is generally coaxial with the output shaft.

19. The compound transmission of claim 15 wherein the main transmission section provides a plurality of selectable forward speed ratios between a main transmission section input shaft and the auxiliary transmission section input shaft.

20. The compound transmission of claim 19 wherein the main transmission section provides five selectable forward speed ratios.

21. The compound transmission of claim 15 wherein the second splitter gear is coupled to the output shaft to provide an overdrive ratio.

* * * * *